No. 660,278. Patented Oct. 23, 1900.
E. SMITH.
DRY PAN.
(Application filed Apr. 16, 1900.)
(No Model.)
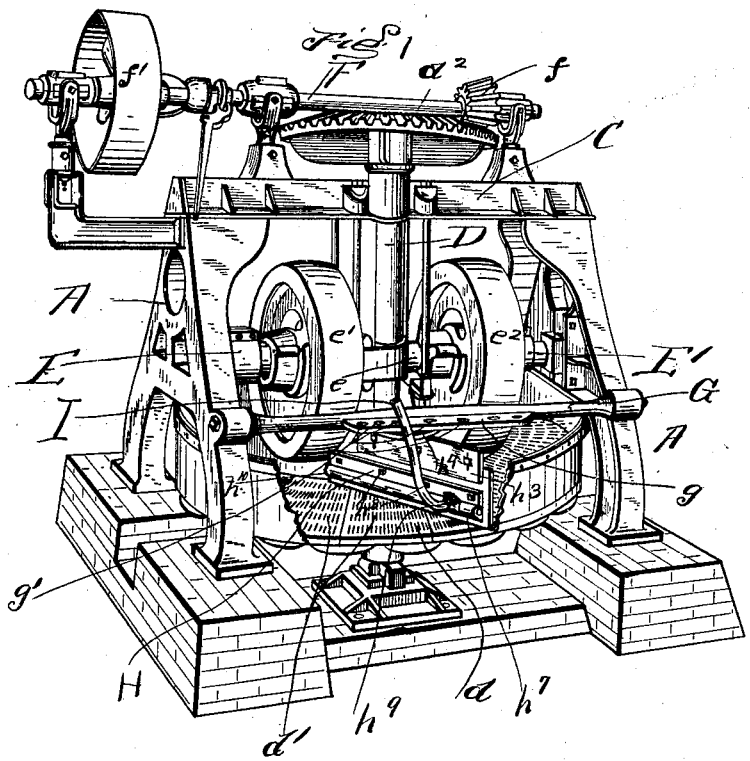
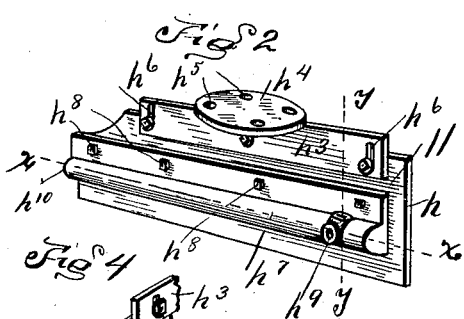
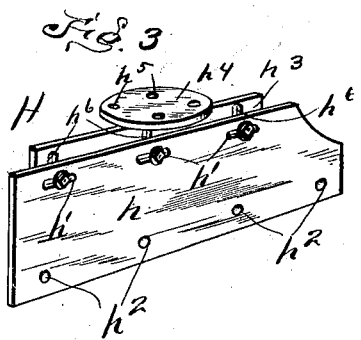
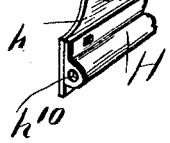
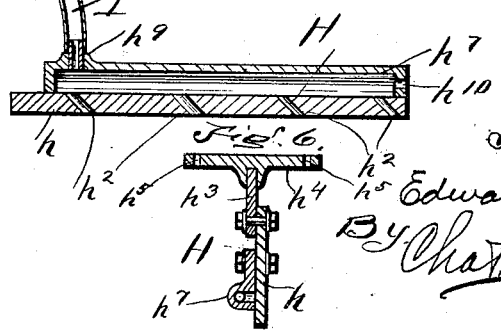
Witnesses:
Inventor.
Edward Smith
By Chas. R. Miller
Atty.
THE NORRIS PETERS CO., PHOTO-LITHO., WASHINGTON, D. C.

UNITED STATES PATENT OFFICE.

EDWARD SMITH, OF CANTON, OHIO, ASSIGNOR OF ONE-HALF TO WILLIAM FREY, OF SAME PLACE.

DRY-PAN.

SPECIFICATION forming part of Letters Patent No. 660,278, dated October 23, 1900.

Application filed April 16, 1900. Serial No. 12,994. (No model.)

*To all whom it may concern:*

Be it known that I, EDWARD SMITH, a citizen of the United States, residing at Canton, in the county of Stark and State of Ohio, have invented new and useful Improvements in Dry-Pans, of which the following is a specification.

My invention relates to improvements in dry-pans for working clay or shale; and it consists, primarily, in providing a plowshare with a steam-chest provided with one or more vents and having a suitable flexible connection with the steam-supply, whereby steam is sprayed into the clay while it is being crushed and pulverized in the dry-pan, as will be hereinafter more fully described and claimed.

Figure 1 is a perspective view of a dry-pan, illustrating my invention. Fig. 2 is a rear view of the plow. Fig. 3 is a front view of the plow. Fig. 4 is a perspective view of a section of the forward end of the plow. Fig. 5 is a longitudinal sectional view through X X. Fig. 6 is a vertical sectional view through Y Y.

In the accompanying drawings similar letters of reference refer to similar parts.

A represents the frame or housing of the dry-pan, which may be of any desired form and is provided with a cross-head C, having journaled therein the upright shaft D, which carries the dry-pan $d$, and is provided with perforated plates $d'$, which permit the pulverized clay to pass therethrough onto the floor. Mounted in sliding boxes E and E' is the roller-shaft $e$, carrying the rollers $e'$ and $e^2$.

For the purpose of driving the upright shaft carrying the pan I have shown the bevel-gear $d^2$, mounted upon the upright shaft D, meshing with the bevel-pinion $f$, mounted upon the counter-shaft F, which carries the belt-pulley $f'$.

The features of construction above described may be varied or changed and are of the common and well-known form of construction.

My invention consists in the following special features of construction: A cross-rail G is mounted in the frame A and is provided with the adjustable swivel-plate $g$, having therein slotted apertures $g'$. The plow H consists of the plowshare $h$, provided at its upper edge with longitudinal slotted apertures $h'$ and at its lower edge from front to rear with slanting openings or apertures $h^2$. The adjusting-plate $h^3$ has formed upon its upper portion and integral therewith the swivel-plate $h^4$, provided with apertures $h^5$, by means of which it is bolted in adjustment to the swivel-plate $g$ on the cross-rail G. For the purpose of adjusting the plowshare up or down or forward or backward upon the swivel-plate I have provided vertical openings $h^6$ in the swivel-plate, by means of which the plowshare and plate may be bolted together at any desired adjustment. The steam chest or box $h^7$ consists of a cast or malleable iron box, open upon one face and end and adapted to be bolted to the plowshare by means of the bolts $h^8$. At the forward end I provide a screw-threaded nipple $h^9$ to receive a corresponding screw-threaded coupling attached to the hose I, which communicates with the steam-supply pipe.

In operation the clay or shale to be pulverized is shoveled into the dry-pan forward of the plow, when the upright shaft D is caused to revolve, carrying with it the pan, which causes the rollers to revolve, crushing the clay or shale. The steam is carried from the steam-supply through the flexible tube I into the steam-chest $h^7$, thence through the steam-orifices $h^2$ on the face of the plowshare and the steam-orifice $h^{10}$ on the end of the steam-chest, thus moistening and heating the clay, rendering it more plastic and more easily pulverized. It is especially desirable in winter-time to thus apply steam, because the shale or clay is frequently frozen into solid masses which it is exceedingly difficult to pulverize without thus heating and moistening. In summer-time water can be similarly supplied through the same appliances, and thus prevent the raising of dust, which becomes so objectionable in operating this class of machinery.

Various changes and modifications may be made in the details of construction without departing from the spirit of my invention, which consists, primarily, in providing a steam or water chest adapted to be attached to the plow of the dry-pan, provided with suitable jets and having a flexible connection with the steam or water supply.

Having thus fully described my invention, what I desire to secure and claim by Letters Patent is—

1. The combination in a dry-pan, of a plow with a steam or water chest attached thereto, and provided with discharge-orifices, and a flexible connection between the supply-pipe and said water-chest, substantially as described and for the purpose set forth.

2. A plow for dry-pans, consisting of a plowshare, a steam or water chest attached thereto, and provided with discharge-orifices, and a flexible coupling connecting the steam or water chest with the supply-pipe, substantially as described and for the purpose set forth.

3. A plow for dry-pans, consisting of an adjustable swivel-plate carrying a plowshare, a steam or water chest attached to the plowshare, and provided with discharge-orifices, and a flexible steam or water-supply pipe, substantially as described and for the purpose set forth.

4. A plowshare for dry-pans, provided with a steam or water chest having discharge-orifices, substantially as described and for the purpose set forth.

In testimony whereof I have hereunto set my hand in the presence of two subscribing witnesses.

EDWARD SMITH.

Witnesses:
    CHAS. R. MILLER,
    CHAS. M. BALL.